United States Patent

Sasaki et al.

[11] Patent Number: 5,159,251
[45] Date of Patent: Oct. 27, 1992

[54] POSITION CORRECTING SYSTEM FOR DIFFERENT WORKPIECE MACHINING POSITIONS

[75] Inventors: Takao Sasaki, Hachioji; Kentaro Fujibayashi, Musashino; Morimasa Sato, Minamitsuru, all of Japan

[73] Assignee: Fanuc Ltd, Minamitsuru, Japan

[21] Appl. No.: 768,591

[22] PCT Filed: Feb. 6, 1991

[86] PCT No.: PCT/JP91/00146
§ 371 Date: Sep. 30, 1991
§ 102(e) Date: Sep. 30, 1991

[87] PCT Pub. No.: WO91/13387
PCT Pub. Date: Sep. 5, 1991

[30] Foreign Application Priority Data
Feb. 26, 1990 [JP] Japan ............... 2-44743

[51] Int. Cl.⁵ ............................ G05B 19/18
[52] U.S. Cl. ......................... 318/572; 318/573; 318/630; 364/474.31
[58] Field of Search ............... 318/560–640; 364/474.01–474.29, 474.31

[56] References Cited

U.S. PATENT DOCUMENTS

| | | | |
|---|---|---|---|
| 3,794,902 | 2/1974 | Nishimura et al. | 318/630 |
| 4,502,108 | 2/1985 | Nozawa et al. | 318/630 |
| 4,743,823 | 5/1988 | Fujita | 318/630 |
| 4,961,034 | 10/1990 | Kakino et al. | 318/600 |
| 4,992,711 | 2/1991 | Sugita et al. | 318/561 |
| 5,015,935 | 5/1991 | Iwashita | 318/630 |
| 5,075,865 | 12/1991 | Kawamura et al. | 318/573 X |
| 5,101,146 | 3/1992 | Teshima | 318/572 |
| 5,101,147 | 3/1992 | Sasaki et al. | 318/573 |
| 5,103,150 | 4/1992 | Sasaki et al. | 318/508.18 |

*Primary Examiner*—Paul Ip
*Attorney, Agent, or Firm*—Staas & Halsey

[57] ABSTRACT

A position correcting system is incorporated in a machine tool having a plurality of workpiece machining positions. A control block (80) has a position correcting register (81) for storing position correctives corresponding to the respective workpiece machining positions. Distributed data (X1, Z1) are calculated from a machining program (71) by a pre-processing means (72). The position correctives ($\Delta X1$, $\Delta Z1$) are added to the distributed data (X1, Z1) by an adder (82), which outputs position commands for machining heads corresponding to the workpiece machining positions. In response to the position commands, an interpolating unit (83) carries out pulse interpolation and produce output pulses. Such control blocks (80, 90, 100) are associated with the respective machining heads. Errors between the workpieces and the machining heads are corrected in all the machining positions, so that the workpieces can be machined with accuracy.

5 Claims, 3 Drawing Sheets

POSITION CORRECTING SYSTEM FOR DIFFERENT WORKPIECE MACHINING POSITIONS

TECHNICAL FIELD

The present invention relates to a position correcting system for a machine tool having a plurality of workpiece machining positions, and more particularly to a position correcting system which corrects the positions of machining heads in each of a plurality of workpiece machining positions.

BACKGROUND ART

There is known an automatic lathe having a cylindrical workpiece holder to which a plurality of workpieces are fixed in respective positions and also having a plurality of machining heads corresponding to the positions where the workpieces are securely held on the cylindrical workpiece holder. In operation, the cylindrical workpiece holder rotates about its own axis to advance the workpieces respectively to next machining positions in which the machining heads machine the respective workpieces. The machining process for each workpiece is completed after it has been machined successively by the machining heads in the machining positions.

For example, an end surface of each workpiece is cut in a first machining position by a first machining head. After the end surface of the workpiece has been cut, the workpiece holder rotates to bring the workpiece to a second machining position. In the second machining position, a second machining head machines the workpiece roughly to a desired outside diameter. After the workpiece has been machined in the second machining position, the workpiece holder rotates to move the workpiece into a third machining position in which a third machining head machines the workpiece roughly to a desired inside diameter. In this manner, the workpiece holder rotates to bring the workpiece to a next machining position where the workpiece is machined in a next machining cycle. The above process is repeated until the workpiece is machined in a final machining position, whereupon the machining process for the workpiece is completed.

When a workpiece moves from one machining position to another, however, the relative position between the workpiece and each machining head varies, resulting in a reduction in the accuracy with which the workpiece is machined. The positioning accuracy of the workpiece with respect to each machining head may be increased by a mechanical means, but it would be highly difficult to position many workpieces relatively to each of the machining heads with a desired level of accuracy.

DISCLOSURE OF THE INVENTION

In view of the aforesaid drawbacks of the conventional workpiece positioning system, it is an object of the present invention to provide a position correcting system for a machine tool having a plurality of workpiece machining positions.

To achieve the above object, there is provided in accordance with the present invention a position correcting system in a machine tool having a plurality of workpiece machining positions, comprising a position correcting register for storing position correctives corresponding to said workpiece machining positions, preprocessing means for calculating distributed data from a machining program, an adder for adding said position correctives to said distributed data to output position commands for machining heads corresponding to said workpiece machining positions, respectively, interpolating means responsive to said position commands, for effecting pulse interpolation to produce output pulses, and axis control modules for controlling servomotors in response to said output pulses.

Previously in the respective machining positions, correctives corresponding to relative errors between the workpieces and the machining heads are stored in the position correcting register. When the workpieces reach the respective workpiece machining positions, the correctives are added to the distributed data, and the pulse interpolation is carried out. Errors between the workpieces and the machining heads are corrected in all the machining positions, so that the workpieces can be machined with accuracy.

BEST MODE FOR CARRYING OUT THE INVENTION

An embodiment of the present invention will hereinafter be described with reference to the drawings.

Figure 2:
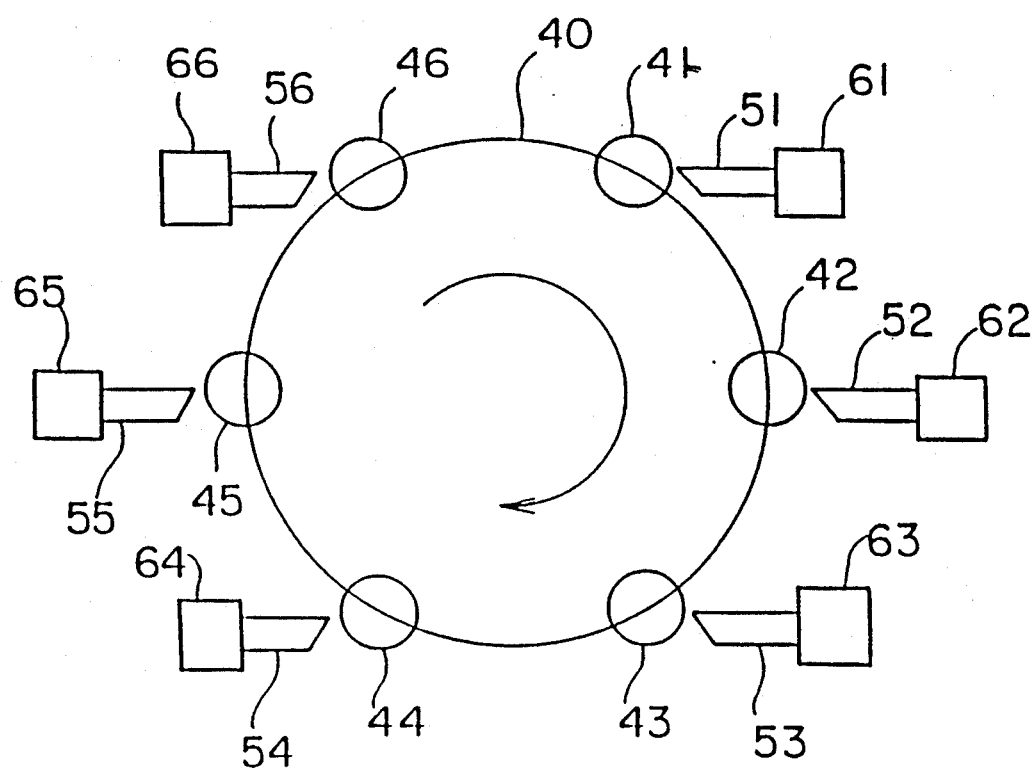
FIG. 2 is a schematic view showing the relationship between workpiece machining positions and machining heads of an automatic lathe.

FIG. 2 schematically shows the relationship between workpiece machining positions and machining heads of an automatic lathe. Workpieces 41, 42, 43, 44, 45, 46 are held on a circumferential edge of a cylindrical workpiece holder 40 by respective chucks (not shown). Each of the workpieces on the workpiece holder 40 is rotatable by a spindle motor (not shown). The workpieces on the workpiece holder 40 can be machined by respective tools 51, 52, 53, 54, 55, 56 fixedly mounted on respective machining heads 61, 62, 63, 64, 65, 66 that are located in respective positions corresponding to the workpieces. Each of the machining heads is controlled by a servomotor (not shown) to move in the direction of an X-axis, which is horizontal in FIG. 2, and also in the direction of a Z-axis, which is vertical to the sheet of FIG. 2.

For example, an end surface of the workpiece 41 is cut in a first machining position by the tool 51. After the end surface of the workpiece 41 has been cut, the workpiece holder 40 rotates 60° to bring the workpiece to a second machining position (shown occupied by the workpiece 42). In the second machining position, the tool 52 supported by the machining head 62 machines the workpiece 41 roughly to a desired outside diameter. After the workpiece 41 has been machined in the second machining position, the workpiece holder 40 rotates 60° to move the workpiece 41 into a third machining position (shown occupied by the workpiece 43) in which the tool 53 supported by the machining head 63 machines the workpiece 41 roughly to a desired inside diameter. In this manner, the workpiece holder 40 rotates to bring the workpiece to a next machining position where the workpiece is machined in a next machining cycle. The above process is repeated until the workpiece 41 is machined in a final machining position (shown occupied by the workpiece 46) by the tool 56 supported on the machining head 66, whereupon the machining process for the workpiece is completed.

When a workpiece moves to a next machining position, the relative position of the workpiece with respect to a next tool varies. For example, if the tip of the tool is displaced with respect to the central position of the work piece, then the workpiece is machined with an error that is caused by the tip displacement. The present invention is aimed for the elimination of such an error between the workpiece and the tool, i.e., the machining head.

Figure 1:
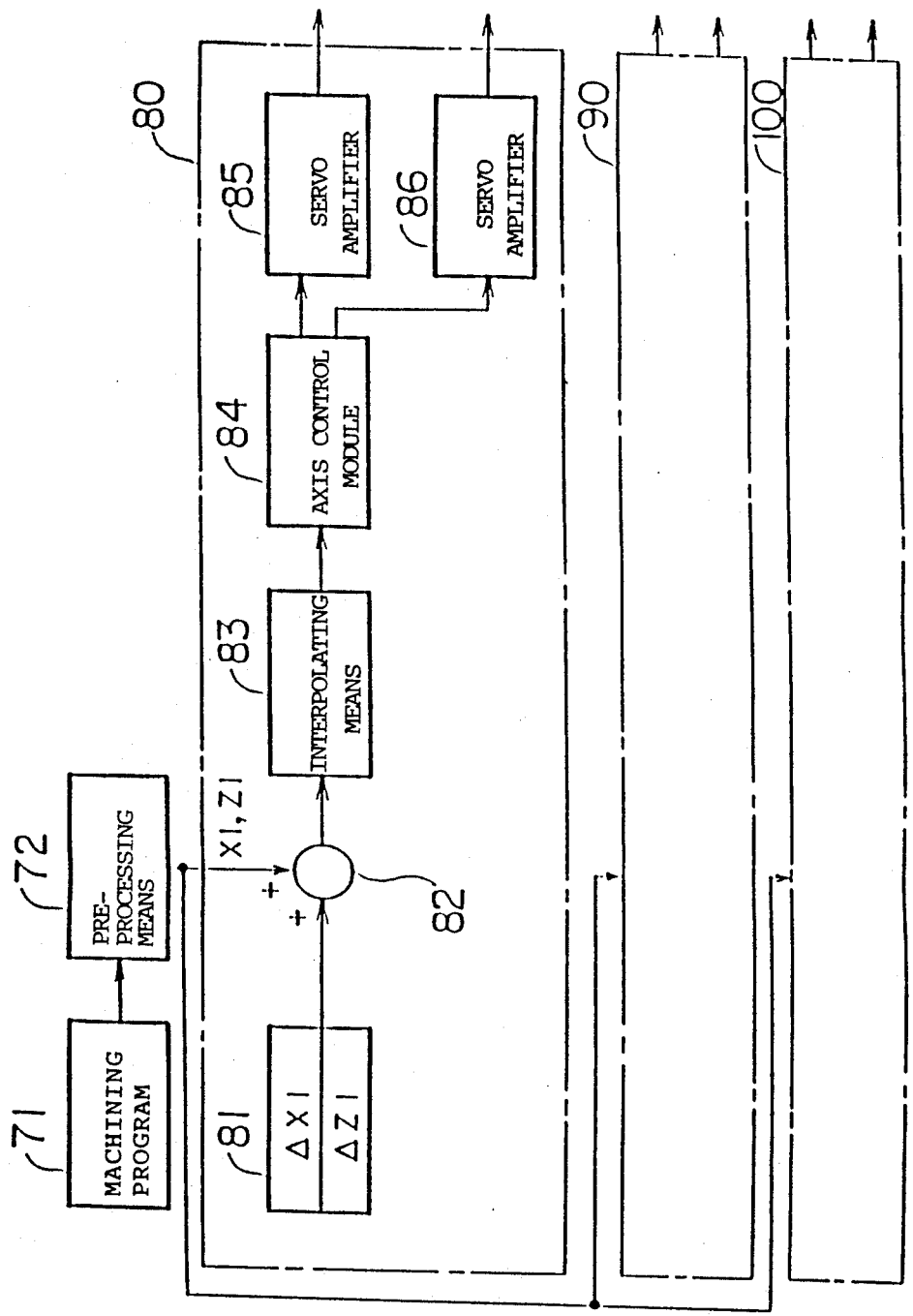
FIG. 1 is a block diagram of a position correcting system according to the present invention.

FIG. 1 shows in block form a position correcting system according to the present invention. A machining program 71 is decoded by a pre-processing means 72, which outputs motion commands to servomotors that control the respective machining heads. FIG. 1 illustrates a control block 80 for controlling the machining head 61, a control block 90 for controlling the machining head 62, and a control block 100 for controlling the machining head 63. Control blocks for controlling the machining heads 64, 65, 66 are omitted from illustration in FIG. 1. Since the control blocks are of identical structure, only the control block 80 will be described below.

The pre-processing means 72 decodes the machining program 71, and outputs distributed data X1, Z1 to control the machining head 61. A register 81 stores position correctives $\Delta X1$, $\Delta Z1$ for the machining head 61. Specifically, the position of the machining head 61 is measured prior to a machining process, and errors of the position are stored as position correctives in the register 81.

The distributed data X1, Z1 and the position correctives $\Delta X1$, $\Delta Z1$ are added to each other by an adder 82, and the sum is supplied as a motion command for the machining head 61 to an interpolating means 83. The interpolating means 83 interpolates output pulses for driving the machining head 61, and outputs the interpolated output pulses to an axis control module 84. In response to a position command, the axis control module 84 applies speed commands for driving servomotors (not shown) to servoamplifiers 85, 86, which then drives the servomotors to control the machining head 61.

Figure 3:
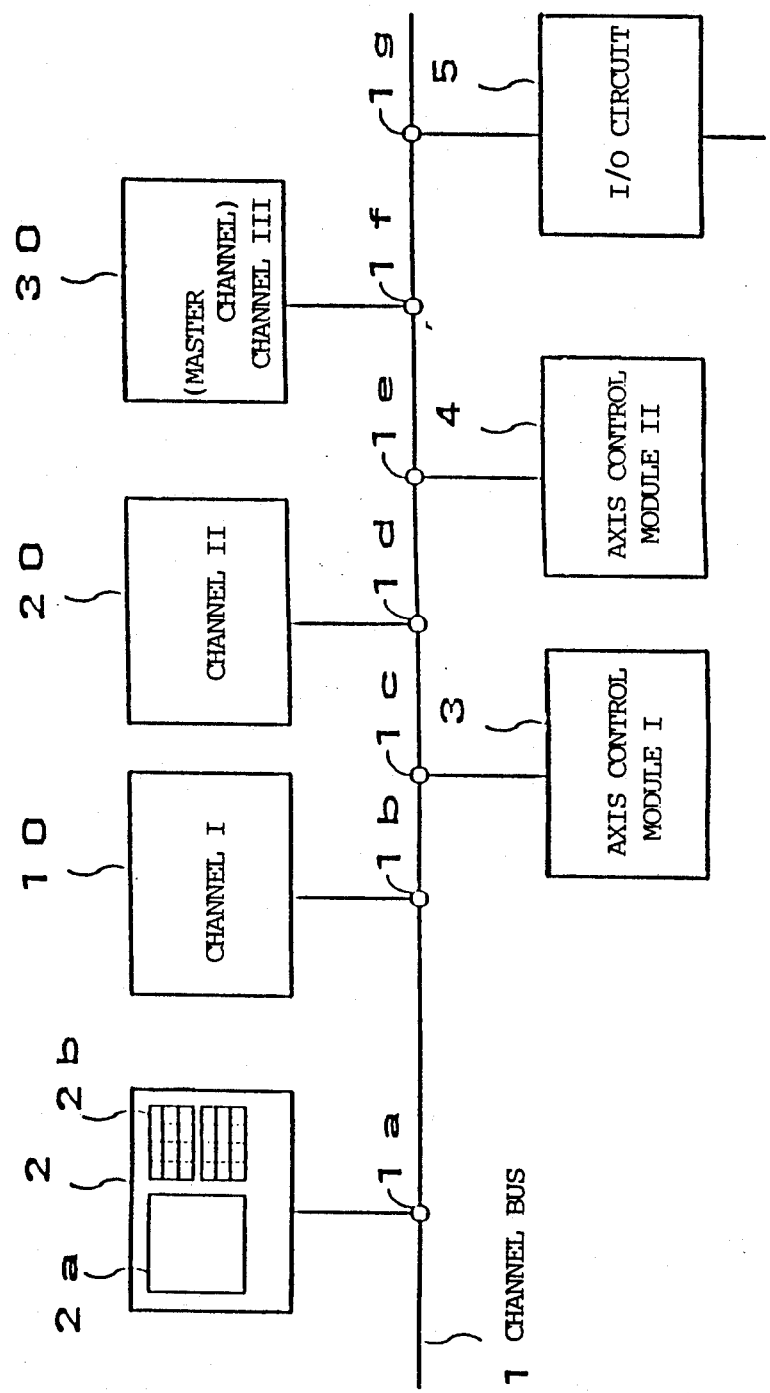
FIG. 3 is a block diagram of a numerical control apparatus that incorporates the principles of the present invention.

FIG. 3 shows in block form a numerical control apparatus that incorporates the principles of the present invention. The numerical control apparatus has a channel bus 1 coupling channels (described later on). The channel buses have a number of slots 1a, 1b, . . . , 1g to which the channels are coupled.

A CRT/MDI unit 2 includes a display device 2a for displaying the present positions of respective axes, machining programs, and the configurations of workpieces. The CRT-MDI unit 2 also has a keyboard 2b for entering necessary data. Axis control modules 3, 4 can control servomotors of two axes each. The axis control module 3 corresponds to the axis control module 84 shown in FIG. 1. While six axis control modules are necessary in reality, only two axis control modules are shown in FIG. 3, with the other axis control modules being omitted from illustration.

An I/O circuit 5 receives input signals from and transmits output signals to an external circuit. The numerical control apparatus also has a PC (programmable controller) which is omitted from illustration.

Channels 10, 20 and 30 have the function of one conventional numerical control apparatus each, each channel being capable of reading, decoding, and executing numerical control commands. The channels 10, 20 and 30 can also control the CRT/MDI unit 2, etc. Therefore, each of the channels 10, 20 and 30 can process commands for a certain number of axes that have heretofore been processed by a conventional numerical control apparatus.

For example, the channel 10 (channel I) controls an X1-axis and a Z1-axis for the control of the first machining head 61, and the channel 20 (channel II) controls an X2-axis and a Z2-axis for the control of the second machining head 62. While six channels are actually required, three channels are shown in FIG. 3, with the other channels being omitted from illustration.

The channel 30 (channel III) serves as a master channel for carrying out the overall control including the monitoring of the other channels, etc. The channels 10, 20 and 30 can control the CRT/MDI unit 2 through the channel bus 1.

These channels 10, 20 and 30 are coupled to the channel bus 1 and divide tasks to be processed among them. If one channel runs short of a processing capability, it transfers a part of its job to another channel. For example, while the channel 10 is executing very fine interpolation and the channel 20 is executing linear interpolation, a part of pre-processing calculations for interpolation is transferred from the channel 10 to the channel 20. As a result, processing capabilities are balanced among the channels 10, 20 and 30 so that tasks assigned to them are not out of balance.

The channel 30 as a master channel carries out the overall control such as for effecting an arbitration process to grant use of the channel bus 1, and monitoring the other channels. The channel 30 can also control the spindle and axes. If the number of tasks to be processed by the channel 30 is increased to the extent the channel 30 is incapable of executing the overall control, and other channels still have excess processing capabilities, then the channel 30 transfers the master channel status to other channels.

While the CRT/MDI unit 2 can be controlled by any of the channels in the above description, the CRT/MDI unit 2 may be coupled to the channel 30 so that it can be controlled only by the channel 30.

In the above description, there are six machining positions and six machining heads. However, they are given only by way of illustrative example, and the present invention is not limited to the illustrated arrangement.

The principles of the present invention are also applicable to any of various machine tools with multiple axes and multiple workpiece machining positions, other than the automatic lathe.

With the present invention, as described above, since the machine positions are corrected at respective machining positions, the workpieces and the machining heads are accurately positioned in the machining positions, and hence the workpieces can be machined with increased accuracy.

We claim:

1. A position correcting system in a machine tool having a plurality of workpiece machining positions, comprising:

a position correcting register for storing position correctives corresponding to said workpiece machining positions;

pre-processing means for calculating distributed data from a machining program;

an adder for adding said position correctives to said distributed data to output position commands for machining heads corresponding to said workpiece machining positions, respectively;

interpolating means responsive to said position commands, for effecting pulse interpolation to produce output pulses; and axis control modules for controlling servomotors in response to said output pulses.

2. A position control system according to claim 1, wherein said machine tool comprises an automatic lathe.

3. A position control system according to claim 1, further including a cylindrical workpiece holder for holding workpieces thereon, said workpiece machining positions arranged around said cylindrical workpiece holder, said cylindrical workpiece holder being rotatable to move the workpieces held thereon successively through said workpiece machining positions.

4. A position control system according to claim 1, wherein said machining heads comprise respective two-axis-controlled tools disposed in said workpiece machining positions, respectively.

5. A position control system according to claim 1, wherein said machine tool has spindle motors for rotating the workpieces, respectively, coupled thereto.

* * * * *